(12) United States Patent
Langstein et al.

(10) Patent No.: US 6,846,885 B2
(45) Date of Patent: Jan. 25, 2005

(54) PROCESS FOR THE PREPARATION OF ISOOLEFIN COPOLYMERS

(75) Inventors: Gerhard Langstein, Kürten (DE); Martin Bohnenpoll, Leverkusen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/393,623

(22) Filed: Mar. 21, 2003

(65) Prior Publication Data

US 2003/0199647 A1 Oct. 23, 2003

Related U.S. Application Data

(62) Division of application No. 09/941,176, filed on Aug. 27, 2001, now Pat. No. 6,562,916.

(30) Foreign Application Priority Data

Aug. 28, 2000 (DE) .......................................... 100 42 118

(51) Int. Cl.⁷ .............................. C08F 4/64; C08F 10/10
(52) U.S. Cl. ......................... 526/89; 526/113; 526/158; 526/348.7; 502/124; 502/132
(58) Field of Search ........................... 526/89, 113, 158, 526/348.7; 502/124, 132

(56) References Cited

U.S. PATENT DOCUMENTS

| 2,682,531 A | 6/1954 | Ernst et al. ................ 260/85.3 |
| 5,663,470 A | 9/1997 | Chen et al. .................. 585/520 |
| 6,015,841 A | 1/2000 | Langstein et al. ............. 522/29 |
| 2001/0014726 A1 | 8/2001 | Langstein et al. .......... 526/217 |

FOREIGN PATENT DOCUMENTS

| EP | 0 279 456 | 8/1988 |
| EP | 0 279 456 A2 * | 8/1988 |
| EP | 0 556 965 A1 | 8/1993 |
| WO | 94/28037 | 12/1994 |

OTHER PUBLICATIONS

Presented at a meeting of the Rubber Division, American Chemical Society, Cleveland, Ohio. May 6–9, 1975. Published in Rubber Chem. and Tech., 49 (month unavailable) 1976, pp. 960–966. High–Molecular–Weight, High–Unsaturation Copolymers of Isobutylene and Conjugated Dienes. I. Synthesis. W. A. Thaler and D. J. Buckley, Sr.

* cited by examiner

Primary Examiner—Robert D. Harlan
(74) Attorney, Agent, or Firm—Godfried R. Akorli; Jennifer R. Seng

(57) ABSTRACT

The present invention provides a novel process for the preparation of isoolefin copolymers in the presence of zirconium halides or hafnium halides or mixtures thereof and organic nitro compounds, especially for the preparation of butyl rubbers, as well as isoolefin copolymers composed of isobutene, isoprene and, optionally, further monomers.

5 Claims, 2 Drawing Sheets

PROCESS FOR THE PREPARATION OF ISOOLEFIN COPOLYMERS

This is a divisional of U.S. patent application Ser. No. 09/941,176 filed on Aug. 27, 2001 now U.S. Pat. No. 6,562,916.

FIELD OF THE INVENTION

The present invention provides a novel process for the preparation of isoolefin copolymers in the presence of zirconium halides and/or hafnium halides and organic nitro compounds, especially for the preparation of butyl rubbers having a relatively high isoprene content, as well as isoolefin copolymers composed of isobutene, isoprene and, optionally, further monomers.

BACKGROUND OF THE INVENTION

Presently, the process used for producing butyl rubber is known, for example, from Ullmanns Encyclopedia of Industrial Chemistry, Vol. A 23, 1993, pages 288–295. The cationic copolymerization of isobutene with isoprene by the slurry process and with methylene chloride as the process solvent is carried out using aluminum trichloride as initiator with the addition of small amounts of water or hydrogen chloride at −90° C. The low polymerization temperatures are necessary in order to achieve sufficiently high molecular weights for rubber applications.

The molecular-weight-lowering (=regulating) effect of the dienic comonomers can, in principle, be compensated for by even lower reaction temperatures. In such a case, however, the side-reactions that lead to gel formation occur to a greater extent. Gel formation at reaction temperatures of about −120° C. and possible methods for the reduction thereof have been described (see: W. A. Thaler, D. J. Buckley, Sr., Meeting of the Rubber Division, ACS, Cleveland, Ohio, May 6–9, 1975, published in Rubber Chemistry & Technology 49, 960–966 (1976)). The auxiliary solvents, such as $CS_2$, that are necessary therefor are on the one hand difficult to handle and, in addition, must be used in relatively high concentrations.

Also known is the gel-free copolymerization of isobutene with various comonomers at temperatures of about −40° C. using pre-formed vanadium tetrachloride, to form products having a sufficiently high molecular weight for rubber applications (EP-A1-818 476).

U.S. Pat. No. 2,682,531 describes zirconium tetrachloride-ether complexes and the use thereof as catalysts for the polymerization of, inter alia, isoolefins. In column 2, line 20 et seq, it is emphasized that the use of zirconium tetrachloride alone leads to unsatisfactory results. The ether that is preferably used is β,β'-dichloroethyl ether, which is carcinogenic. Diphenyl ether, which is also mentioned as an example, leads only to poorly soluble complexes that exhibit adequate activity only when metered in extremely large amounts. Diethyl ether (which is mentioned specifically as a possible ether in the patent) leads to complexes that are completely inactive.

SUMMARY OF THE INVENTION

The object of the present invention was to provide a process for the preparation of high molecular weight, low-gel isoolefin copolymers, especially for the preparation of butyl rubbers having more than 2% isoprene in the polymer.

The present invention provides a process for the preparation of high molecular weight isoolefin copolymers in the presence of zirconium halides and/or hafnium halides, wherein the process comprises the step of carrying out polymerization in the presence of organic nitro compounds.

DETAILED DESCRIPTION OF THE INVENTION

Figure 1:
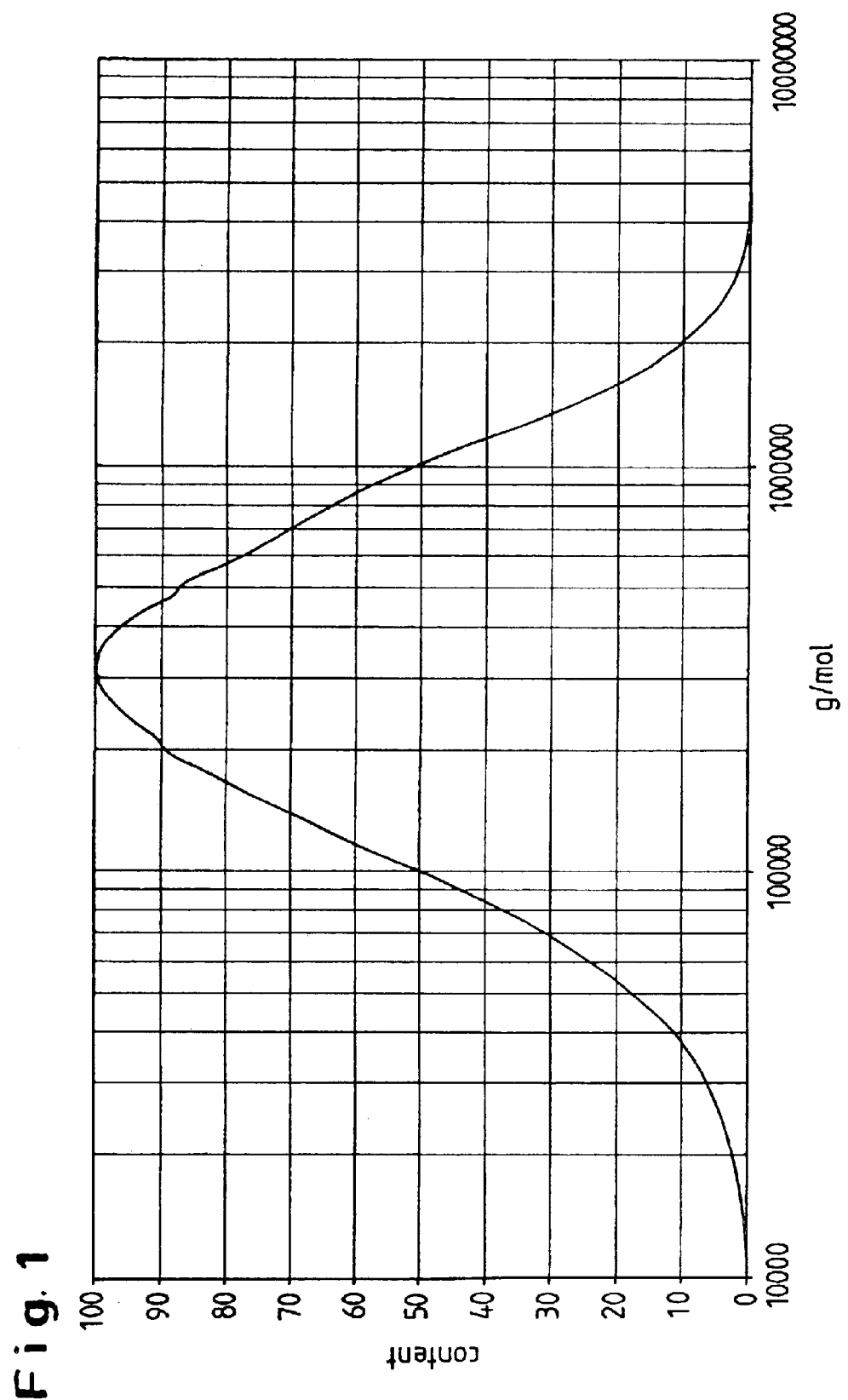
FIG. 1 shows the molecular weight distribution of Example 2.

The process is preferably used in the case of isoolefins having from 4 to 16 carbon atoms and dienes that are copolymerizable with the isoolefins optionally in the presence of further monomers that are copolymerizable with the monomers. Special preference is given to the use of isobutene and isoprene optionally in the presence of further monomers that are copolymerizable therewith.

The process is preferably carried out in a solvent suitable for cationic polymerization, such as halogenated and non-halogenated hydrocarbons or mixtures thereof, especially chloroalkanes and chloroalkane/alkane mixtures, preferably methyl chloride and methylene chloride or mixtures thereof with alkanes.

The zirconium halide and/or hafnium halide is preferably mixed with the nitroorganic compound in the absence of the monomer.

The organic nitro compounds that are used are generally known and generally available. The nitro compounds that are preferably used according to the present invention are defined by the general formula (I)

$$R-NO_2 \qquad (I)$$

wherein R is selected from the group $C_1$–$C_{18}$-alkyl, $C_3$–$C_{18}$-cycloalkyl or $C_6$–$C_{24}$-cycloaryl.

$C_1$–$C_{18}$-Alkyl is to be understood as meaning all linear or branched alkyl radicals having from 1 to 18 carbon atoms that are known to the person skilled in the art, such as methyl, ethyl, n-propyl, isopropyl, n-butyl, isobutyl, tert-butyl, n-pentyl, isopentyl, neopentyl, hexyl and the further homologues, which in turn may be substituted. Suitable substituents are especially alkyl, as well as cycloalkyl or aryl, such as benzyl, trimethylphenyl, ethylphenyl. Linear alkyl radicals having from 1 to 18 carbon atoms are preferred, especially methyl, ethyl and benzyl.

$C_6$–$C_{24}$-Aryl is to be understood as meaning all mono- or poly-nuclear aryl radicals having from 6 to 24 carbon atoms that are known to the person skilled in the art, such as phenyl, naphthyl, anthracenyl, phenanthracenyl and fluorenyl, which, in turn, may be substituted. Suitable substituents are especially alkyl, as well as cycloalkyl or aryl, such as toloyl and methylfluorenyl. Phenyl is preferred.

$C_3$–$C_{18}$-Cycloalkyl is to be understood as meaning all mono- or poly-nuclear cycloalkyl radicals having from 3 to 18 carbon atoms that are known to the person skilled in the art, such as cyclopropyl, cyclobutyl, cyclopentyl, cyclohexyl, cycloheptyl, cyclooctyl and the further homologues, which, in turn, may be substituted. Suitable substituents are especially alkyl, as well as cycloalkyl or aryl, such as benzyl, trimethylphenyl, ethylphenyl. Cyclohexyl and cyclopentyl are preferred.

The concentration of the organic nitro compound in the reaction medium is preferably in the range from 5 to 15,000 ppm, especially in the range from 50 to 7000 ppm. The molar ratio of nitro compound to zirconium and/or hafnium is preferably in the region of 100:1, more preferably, in the region of 25:1 and most preferably, in the range from 14:1 to 1:1.

Polymerization of the monomers is generally carried out cationically at temperatures in the range from −120° C. to +20° C., preferably in the range from −100° C. to −20° C., and at pressures in the range from 0.1 to 4 bar.

Suitable zirconium halides and/or hafnium halides are, for example, zirconium dichloride, zirconium trichloride, zirconium tetrachloride, zirconium oxydichloride, zirconium tetrafluoride, zirconium tetrabromide and zirconium tetraiodide, hafnium dichloride, hafnium trichloride, hafnium oxydichloride, hafnium tetrafluoride, hafnium tetrabromide and hafnium tetraiodide and hafnium tetrachloride. Zirconium halides and/or hafnium halides having sterically demanding substituents, such as, for example, zirconocene dichloride or bis(methylcyclopentadienyl) zirconium dichloride, are generally unsuitable. Preference is given to the use of zirconium tetra-chloride. It may advantageously be used in the form of a solution in an anhydrous and oxygen-free alkane or chloroalkane, or a mixture of the two, having a zirconium concentration of less than 4 wt. %. It may be advantageous to store (age) the Zr solution for a period of from a few minutes up to 1000 hours at room temperature or below before it is used. It may be advantageous to carry out such aging under the action of light.

It may also be advantageous to use mixtures of the catalyst system according to the present invention with conventional catalysts, such as $AlCl_3$ and catalyst systems that can be prepared from $AlCl_3$, diethylaluminum chloride, ethylaluminum chloride, titanium tetrachloride, tin tetrachloride, boron trifluoride, boron trichloride, vanadium tetrachloride or methylalumoxane, especially $AlCl_3$ and catalyst systems that can be prepared from $AlCl_3$. Such a combination forms a further subject of the invention.

In the preparation of such mixtures, the molar ratio Lewis acid:zirconium and/or hafnium may be in the range from 99:1 to 1:99, preferably in the range from 99:1 to 1:1, more preferably in the range from 20:1 to 5:1.

The molar ratio of nitro compound to zirconium and/or hafnium in such mixtures is preferably in the region of 1000:1, more preferably in the region of 250:1 and most preferably in the range from 100:1 to 1:1.

It may be advantageous to add to the catalyst system small amounts of water, alcohols, of an alkyl halide or hydrogen halide.

The polymerization may be carried out in either continuous or discontinuous operation. In the case of continuous operation, the process is preferably carried out with the following three feed streams:
solvent/diluent+isoolefin (preferably isobutene)
diene (preferably isoprene)
zirconium halide and/or hafnium halide (preferably $ZrCl_4$ in solvent)+organic nitro compound.

In the case of discontinuous operation, the process may be carried out, for example, as follows:

The reactor, pre-cooled to reaction temperature, is charged with the solvent or diluent and the monomers. The initiator together with the nitro compound in the form of a dilute solution is then pumped in, such that the heat of polymerization can be dissipated without difficulty. The progress of the reaction can be monitored by means of the evolution of heat.

All operations are carried out under protecting gas. When the polymerization is complete, the reaction is terminated using a phenolic antioxidant, such as, for example, 2,2′-methylene-bis-(4-methyl-6-tert-butylphenol), dissolved in ethanol.

By means of the process according to the present invention it is possible to prepare high molecular weight isoolefin copolymers. The double bonds are determined by the amount of diene that is incorporated. The molecular weights (Mv) usually range (according to the isoprene content and the reaction temperature) from 300 to 1200 kg/mol, and the polymers have a very low gel content.

A major advantage of the process according to the present invention is, in addition, the marked reduction in so-called "fouling". The person skilled in the art will understand by fouling the formation of polymer deposits on the walls of the reactor and inside the heat exchanger. As a result of such deposits, dissipation of the heat of reaction that forms is impaired and, ultimately, disrupted to such an extent that the reactor must be cleaned after a few days in order to ensure proper operation.

The polymers that are obtainable are surprisingly well suited for the production of molded bodies of any kind, especially tire components, very especially so-called inner liners, as well as so-called technical rubber articles, such as plugs, damping elements, profile sections, films, coatings. To that end, the polymers are used in pure form or in admixture with other rubbers, such as BR, HNBR, NBR, SBR, EPDM or fluorine rubbers.

The Examples which follow are given to illustrate the present invention:

EXAMPLES

Experimental Details

The gel contents were determined in toluene after a dissolving time of 24 hours at 30° C. with a sample concentration of 12.5 g/l. The insoluble constituents were separated off by ultracentrifugation (1 hour at 20,000 rpm and 25° C.). Samples having a high gel content were examined in o-dichlorobenzene at 140° C.

The intrinsic viscosity η of the soluble constituents was determined in toluene at 30° C. by Ubbelohde capillary viscometry.

The molecular weight Mv calculated from the limiting viscosity number was determined according to the following formula: $\ln (M_v) = 12.48 + 1.565 * \ln \eta$.

The Mooney value was determined at 125° C. after a measurement time of 8 minutes.

The protecting gas used was argon of grade 4.8 (Linde).

The monomer incorporation and the branching point[1] were determined by means of high-field proton resonance.

The isobutene (Gerling+Holz, Germany, grade 2.8) used in the polymerizations was, for drying purposes, passed through a column packed with sodium on aluminum oxide (content 10%).

In order to remove the stabilizer, the isoprene (Acros, 99%) that was used was filtered under argon through a column of dried aluminum oxide, distilled over calcium hydride under an argon atmosphere, and used in that form for the polymerization. The water content was 25 ppm.

The methyl chloride (Linde, grade 2.8) that was used was, for purification purposes, passed through a column of activated carbon and through a further column containing Sicapent, and was used in that form.

The methylene chloride (Merck, grade: for analysis ACS, ISO) was distilled over phosphorus pentoxide, under an argon atmosphere, for drying purposes.

The nitromethane (Aldrich, 96%) was first stirred for two hours with phosphorus pentoxide, a constant stream of argon being passed through the mixture. Distillation was then carried out in vacuo at about 20 mbar.

The zirconium tetrachloride (>=98%) that was used was obtained from Fluka.

The aluminum trichloride (98.5%) that was used was obtained from Janssen Chimica.

A prechilled solution of 2 g Irganox 1010 (Ciba) in 250 ml of ethanol was used to terminate the polymerization reactions.

Example 1 (Preparation of the Initiator)

14.56 g (62.5 mmol) of zirconium tetrachloride were placed in a two-necked round-bottomed flask under an argon atmosphere. 500 ml of methylene chloride and 44.3 ml (49.9 g) of nitromethane were added (ratio Zr/nitromethane 1:13).

The mixture was stirred for 2 hours at room temperature and then left to stand for 24 hours. The still undissolved constituents (small amount, presumably zirconium dioxide) settled at the bottom of the flask during that time. The colorless supernatant solution was used to initiate the polymerization.

In the course of several days, a change in the color of the solution to yellow→orange is observed, obviously as a result of decomposition of the initiator. A slight yellow coloring can be tolerated, an orange-colored solution loses a large part of its activity.

Example 2

In a two-liter four-necked flask, 700 g (679.2 ml) of methyl chloride and 52 g (0.93 mol) of isobutene were condensed (concentration 6.91 wt. %) under an argon atmosphere at a temperature of −80° C.

After addition of 1.6 g (0.02 mol, 2.35 ml) of isoprene (2.47 mol %), 3 ml of initiator solution from Example 1 were metered in during the course of 5 minutes. The vigorous reaction was terminated after 5 minutes. A finely divided milky suspension was obtained, without the formation of flakes and without fouling.

The polymer that formed was precipitated by addition of 2500 ml of acetone, pre-dried by pressing on a laboratory roll and then dried overnight in vacuo at 50° C.

The analytical results are shown in Table 1 below.

TABLE 1

| | |
|---|---|
| Yield | 22.5 g (42%) |
| Staudinger index | 1.096 dl/g |
| Molecular weight Mv | 303.6 kg/mol |
| Mn | 185.1 kg/mol |
| Mw | 436.5 kg/mol |
| Gel content | 0.7% |
| Isoprene incorporation | 2.2% |

FIG. 1 Shows the Result of the GPC Investigation of Example 2.

Example 3

In a two-liter four-necked flask, 700 g (679.2 ml) of methyl chloride and 120 g (2.14 mol) of isobutene were condensed (concentration 15 wt. %) under an argon atmosphere at a temperature of −95° C. After addition of 4.98 g (0.07 mol, 7.3 ml) of isoprene (3.3 mol %), 25 ml of initiator solution according to Example 1 were metered in during the course of 30 minutes. A milky suspension was obtained, fouling did not occur. The weak reaction was terminated after 30 minutes.

The polymer that formed was precipitated by addition of 2500 ml of acetone, pre-dried by pressing on a laboratory roll and then dried overnight in vacuo at 50° C.

The analytical results are shown in Table 2 below.

TABLE 2

| | |
|---|---|
| Yield | 42.1 g (33.7%) |
| Staudinger index | 1.74 dl/g |
| Gel content | 0.6% |
| Molecular weight Mv | 625.8 kg/mol |
| Mn | 386.2 kg/mol |
| Mw | 830.1 kg/mol |
| Isoprene incorporation | 1.9% |
| Mooney value | 81.5 |

Example 4

In a two-liter four-necked flask, 700 g (679.2 ml) of methyl chloride and 300 g (5.35 mol) of isobutene were condensed (concentration 30 wt. %) under an argon atmosphere at a temperature of −95° C. After addition of 27.4 g (0.4 mol, 40.23 ml) of isoprene (7 mol %), 7 ml of initiator solution according to Example 1 were metered in during the course of 10 minutes. The vigorous reaction was terminated after 5 minutes.

The polymer that formed was precipitated by addition of 2500 ml of acetone, pre-dried by pressing on a laboratory roll and then dried overnight in vacuo at 50° C.

The analytical results are shown in Table 3 below.

TABLE 3

| | |
|---|---|
| Yield | 12.1 g (3.7%) |
| Staudinger index | 2.337 dl/g |
| Molecular weight Mv | 993 kg/mol |
| Mn | 448.8 kg/mol |
| Mw | 1070 kg/mol |
| Gel content | 1.5% |
| Isoprene incorporation | 3.5% |

Example 5 (Comparison Example According to U.S. Pat. No. 2,682,531: Preparation of the Initiator)

14.56 g (62.5 mmol) of zirconium tetrachloride were placed in a 33 methylene chloride and 10.5 ml (11.3 g) of diphenyl ether were added (ratio Zr/diphenyl ether 1:1).

The mixture was stirred for 6 hours at room temperature and then left to stand for 22 days. The still undissolved constituents settled at the bottom of the flask during that time. The deep-red supernatant solution was used to initiate the polymerization.

Example 6 (Comparison Example According to U.S. Pat. No. 2,682,531: Polymerization)

In a two-liter four-necked flask, 700 g (679.2 ml) of methyl chloride and 230 g (4.10 mol) of isobutene were condensed (concentration 26.4 wt. %) under an argon atmosphere at a temperature of −95° C. After addition of 21 g (0.31 mol, 30.84 ml) of isoprene (7 mol %), 150 ml of initiator solution (Example 5) were metered in during the course of 45 minutes. The reaction was terminated immediately after the addition was complete.

The polymer that formed was precipitated by addition of 2500 ml of acetone, pre-dried by pressing on a laboratory roll and then dried overnight in vacuo at 50° C.

The analytical results are shown in Table 4 below.

TABLE 4

| Yield | 125.8 g (50.12%) |
|---|---|
| Staudinger index | 0.919 dl/g |
| Molecular weight Mv | 230.4 kg/mol |
| Mn | 54.9 kg/mol |
| Mw | 370.6 kg/mol |
| Gel content | 29% |
| Mooney value | 44.3 |

The analytical results for the product show only a low molecular weight, despite the good Mooney value, and a gel content that is much too high for most rubber applications. Example 4 according to the present invention, which was carried out under comparable conditions, resulted in a markedly better product.

Preparation of further initiator systems using various nitro compounds

Example 7 (Preparation of an Initiator Using 2-nitropropane)

11.4 g (48.9 mmol) of zirconium tetrachloride were placed in a two-necked round-bottomed flask under an argon atmosphere. 390 ml of methylene chloride and 95 ml (94.24 g) of 2-nitropropane were added (ratio Zr/nitro compound 1:21.6).

The mixture was stirred for 2 hours at room temperature and then left to stand for 5 days. The still undissolved constituents (small amount) settled at the bottom of the flask during that time. The colorless supernatant solution was used to initiate the polymerization.

Example 8 (Preparation of an Initiator using 1-nitropropane)

0.7 g (3 mmol) of zirconium tetrachloride was placed in a two-necked round-bottomed flask under an argon atmosphere. 24 ml of methylene chloride and 3.5 ml (3.47 g) of 1-nitropropane were added (ratio Zr/nitro compound 1:13).

The mixture was stirred for 2 hours at room temperature and then left to stand for 2 days. The still undissolved constituents (small amount) settled at the bottom of the flask during that time. The colorless supernatant solution was used to initiate the polymerization.

Example 9 (Preparation of an Initiator using Nitroethane)

1.9 g (8.15 mmol) of zirconium tetrachloride were placed in a two-necked round-bottomed flask under an argon atmosphere. 65 ml of methylene chloride and 7.8 ml (8.15 g) of nitroethane were added (ratio Zr/nitro compound 1:13.3).

The mixture was stirred for 2 hours at room temperature and then left to stand for 4 days. The still undissolved constituents (small amount) settled at the bottom of the flask during that time. The colorless supernatant solution was used to initiate the polymerization.

Example 10 (Preparation of an Initiator using Nitrobenzene)

9.7 g (41.6 mmol) of zirconium tetrachloride were placed in a two-necked round-bottomed flask under an argon atmosphere. 330 ml of methylene chloride and 60 ml (71.76 g) of nitrobenzene were added (ratio Zr/nitro compound 1:14).

The mixture was stirred for 2 hours at room temperature and then left to stand for one day. The still undissolved constituents (small amount) settled at the bottom of the flask during that time. The colorless supernatant solution was used to initiate the polymerization.

Use of the initiator systems of Examples 7 to 10

Example 11

In a two-liter four-necked flask, 700 g (679.2 ml) of methyl chloride and 120 g (2.14 mol) of isobutene were condensed (concentration 15 wt. %) under an argon atmosphere at a temperature of −95° C. After addition of 4.98 g (0.07 mol, 7.3 ml) of isoprene (3.3 mol %), 25 ml of initiator solution according to Example 7 were metered in during the course of 30 minutes. The weak reaction was terminated after 30 minutes.

The polymer that formed was precipitated by addition of 2500 ml of acetone, pre-dried by pressing on a laboratory roll and then dried overnight in vacuo at 50° C.

The analytical results are shown in Table 5 below.

TABLE 5

| Yield | 1.1 g (0.9%) |
|---|---|
| Staudinger index | 0.682 dl/g |
| Gel content | 1.1% |
| Molecular weight Mv | 144.5 kg/mol |
| Mn | 82.6 kg/mol |
| Mw | 198.3 kg/mol |

The analytical results show that 2-nitropropane in the form of the branched compound has markedly poorer properties than linear nitro-alkyls.

Example 12

In a two-liter four-necked flask, 700 g (679.2 ml) of methyl chloride and 120 g (2.14 mol) of isobutene were condensed (concentration 15 wt. %) under an argon atmosphere at a temperature of −95° C. After addition of 4.98 g (0.07 mol, 7.3 ml) of isoprene (3.3 mol %), 5 ml of initiator solution according to Example 8 were metered in during the course of 5 minutes. A milky suspension with occasional flocks was obtained, fouling did not occur. The vigorous reaction was terminated immediately after the addition was complete.

The polymer that formed was precipitated by addition of 2500 ml of acetone, pre-dried by pressing on a laboratory roll and then dried overnight in vacuo at 50° C.

The analytical results are shown in Table 6 below.

TABLE 6

| Yield | 4.1 g (3.3%) |
|---|---|
| Staudinger index | 2.2 dl/g |
| Gel content | 0.9% |
| Molecular weight Mv | 903.4 kg/mol |
| Mn | 610.2 kg/mol |
| Mw | 1294 kg/mol |

Example 13

In a two-liter four-necked flask, 700 g (679.2 ml) of methyl chloride and 120 g (2.14 mol) of isobutene were condensed (concentration 15 wt. %) under an argon atmosphere at a temperature of −95° C. After addition of 4.98 g (0.07 mol, 7.3 ml) of isoprene (3.3 mol %), 6 ml of initiator solution according to Example 9 were metered in during the course of 10 minutes. A milky suspension was obtained, fouling did not occur. The vigorous reaction was terminated immediately after the addition was complete.

The polymer that formed was precipitated by addition of 2500 ml of acetone, pre-dried by pressing on a laboratory roll and then dried overnight in vacuo at 50° C.

The analytical results are shown in Table 7 below.

TABLE 7

| Yield | 6.4 g (5.1%) |
|---|---|
| Staudinger index | 1.451 dl/g |
| Gel content | 0.8% |
| Molecular weight Mv | 471 kg/mol |
| Mn | 304.1 kg/mol |
| Mw | 627.9 kg/mol |

Example 14

In a two-liter four-necked flask, 700 g (679.2 ml) of methyl chloride and 120 g (2.14 mol) of isobutene were condensed (concentration 15 wt. %) under an argon atmosphere at a temperature of −95° C. After addition of 4.98 g (0.07 mol, 7.3 ml) of isoprene (3.3 mol %), 25 ml of initiator solution according to Example 10 were metered in during the course of 30 minutes. The weak reaction was terminated after 30 minutes.

The polymer that formed was precipitated by addition of 2500 ml of acetone, pre-dried by pressing on a laboratory roll and then dried overnight in vacuo at 50° C.

The analytical results are shown in Table 8 below.

TABLE 8

| Yield | 2.3 g (0.9%) |
|---|---|
| Staudinger index | 1.721 dl/g |
| Gel content | 1.2% |
| Molecular weight Mv | 615.2 kg/mol |
| Mn | 363.9 kg/mol |
| Mw | 877.7 kg/mol |

Example 15 Dependence of the Molecular Weights on Temperature General Procedure

In a two-liter four-necked flask, 700 g (679.2 ml) of methyl chloride and 52 g (0.93 mol) of isobutene were condensed (concentration 6.9 wt. %) under an argon atmosphere at a temperature of −70° C. After addition of 1.6 g (0.02 mol, 2.4 ml) of isoprene (2.47 mol %), the batch was brought to the desired reaction temperature by heating or by cooling, and the initiator solution according to Example 1 was metered in. The generally very vigorous reaction was terminated as soon as it was no longer possible to control the temperature.

The polymer that formed was precipitated by addition of 2500 ml of acetone, pre-dried by pressing on a laboratory roll and then dried overnight in vacuo at 50° C.

The details of the individual tests are shown in Table 9 below.

TABLE 9

| No | Reaction temperature (° C.) | Staudinger index (dl/g) | T (K) | 1/T*1000 | Mv (g/mol) | ml of initiator solution | Reaction time (min) | Yield (g) |
|---|---|---|---|---|---|---|---|---|
| a | −95 | 1.925 | 178.16 | 5.6129322 | 733042.632 | 5 | 1 | 6.8 |
| b | −85 | 1.924 | 188.16 | 5.31462585 | 732446.765 | 5 | 1 | 12.3 |
| c | −80 | 1.096 | 193.16 | 5.17705529 | 303597.822 | 3 | 5 | 22.5 |
| d | −70 | 0.693 | 203.16 | 4.92222879 | 148163.984 | 9 | 15 | 25.2 |
| e | −60 | 0.348 | 213.16 | 4.69131169 | 50415.7986 | 4 | 10 | 23 |
| f | −50 | 0.308 | 223.16 | 4.4810898 | 41646.3558 | 4 | 10 | 26.4 |
| g | −40 | 0.219 | 233.16 | 4.28890033 | 24422.5031 | 7 | 10 | 36.4 |

Figure 2:
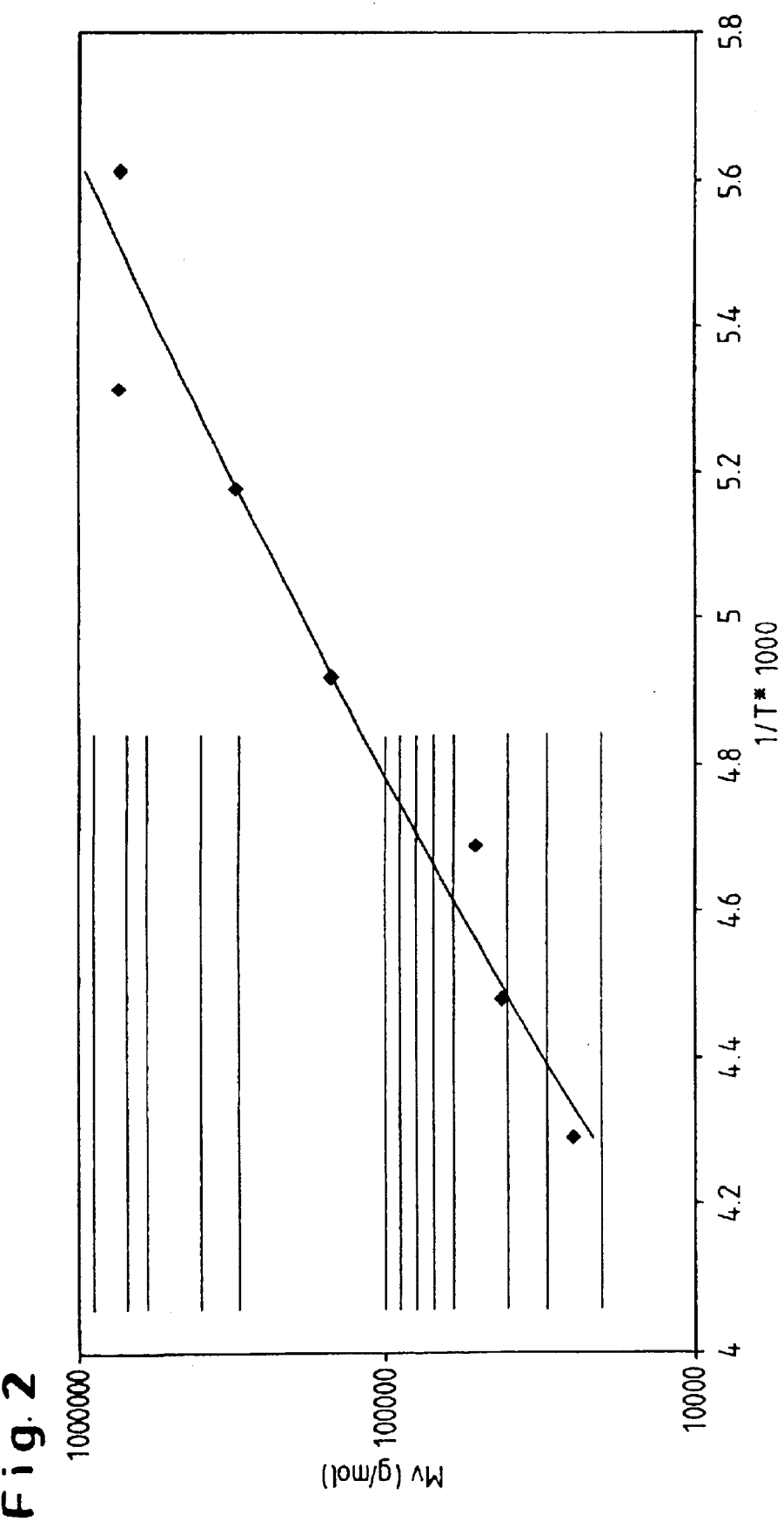
FIG. 2 shows Mv as a function of temperature, the parameters of the curve are $y=2E-05x^{14.133} R^2=0.9559$.

The dependence of the molecular weight on temperature is shown in FIG. 2.

Example 16 (Variation of the Amount of Isoprene) General Procedure

In a two-liter four-necked flask, 700 g (679.2 ml) of methyl chloride and 52 g (0.93 mol) of isobutene were condensed (concentration 6.9 wt. %) under an argon atmosphere at a temperature of −80° C. After addition of different amounts of isoprene, the initiator solution according to Example 1 was metered in. The generally very vigorous reaction was terminated as soon as it was no longer possible to control the temperature.

The polymer that formed was precipitated by addition of 2500 ml of acetone, pre-dried by pressing on a laboratory roll and then dried overnight in vacuo at 50° C.

The details of the individual tests are shown in Table 10 belo

TABLE 10

| No | Isoprene (g) | Isoprene (mol %) | Initiator solution (ml) | Yield (g) | Staudinger index (dl/g) | Gel content (wt. %) | Mv (g/mol) | Total isoprene incorporation, mol % | 1,4-isoprene incorporation, mol % |
|---|---|---|---|---|---|---|---|---|---|
| a | 0 | 0.000 | 3 | 7.6 | 3.348 | 1 | 1,742,948 | 0 | |
| b | 1 | 1.559 | 4 | 10.2 | 1.488 | 0.9 | 489,913 | 0.8 | 0.7 |
| c | 1.16 | 1.804 | 6 | 18.1 | 1.553 | 0.8 | 523,816 | 0.9 | 0.83 |

TABLE 10-continued

| No | Isoprene (g) | Isoprene (mol %) | Initiator solution (ml) | Yield (g) | Staudinger index (dl/g) | Gel content (wt. %) | Mv (g/mol) | Total isoprene incorporation, mol % | 1,4-isoprene incorporation, mol % |
|---|---|---|---|---|---|---|---|---|---|
| d | 1.3 | 2.018 | 5 | 11.2 | 1.519 | 0.8 | 505,980 | 1 | 0.91 |
| e | 4 | 5.959 | 7 | 20.3 | 0.98 | 0.4 | 254,838 | 2.9 | 2.42 |
| f | 7 | 9.981 | 14 | 25.6 | 0.914 | 0.7 | 228,495 | 6 | 5.01 |
| g | 15.8 | 20.018 | 11 | 12.0 | 0.968 | 1.2 | 249,971 | 11.2 | 9.31 |

As will be seen from this Table, virtually gel-free copolymers of isobutene and isoprene having an isoprene content of more than 10% can be prepared at −80° C. using the initiator system according to the present invention.

Combinations of zirconium tetrachloride with Lewis acids

Example 17 $AlCl_3/ZrCl_4$ 9:1

1.2 g (5.1 mmol) of zirconium tetrachloride and 6.2 g (46.5 mmol) of aluminum trichloride were placed in a two-necked round-bottomed flask under an argon atmosphere. 410 ml of methylene chloride and 23 ml (25.9 g) of nitromethane were added (ratio Zr/nitro compound 1:82.5).

The mixture was stirred for 2 hours at room temperature and then left to stand for 5 days. The still undissolved constituents (small amount) settled at the bottom of the flask during that time. The colorless supernatant solution was used to initiate the polymerization.

Example 18 $AlCl_3/ZrCl_4$ 19:1

0.7 g (3.0 mmol) of zirconium tetrachloride and 7.6 g (57.0 mmol) of aluminum trichloride were placed in a two-necked round-bottomed flask under an argon atmosphere. 480 ml of methylene chloride and 3 ml (3.38 g) of nitromethane were added (ratio Zr/nitro compound 1:18.4).

The mixture was stirred for 2 hours at room temperature and then left to stand for 2 days. The still undissolved constituents (small amount) settled at the bottom of the flask during that time. The colorless supernatant solution was used to initiate the polymerization.

Example 19 $TiCl_4/ZrCl_4$ 9:1

1.4 g (6.0 mmol) of zirconium tetrachloride and 10.207 g (53.8 mmol) of titanium tetrachloride were placed in a two-necked round-bottomed flask under an argon atmosphere. 480 ml of methylene chloride and 7 ml (7.89 g) of nitromethane were added (ratio Zr/nitro compound 1:21.5).

The mixture was stirred for 2 hours at room temperature and then left to stand for 4 days. The still undissolved constituents (small amount) settled at the bottom of the flask during that time. The colorless supernatant solution was used to initiate the polymerization.

Example 20 $AlCl_3/ZrCl_4$ 9:1 with Activation by Means of HCl 12.2 g (52.4 mmol) of zirconium tetrachloride were placed in a two-necked round-bottomed flask under an argon atmosphere. 420 ml of methylene chloride and 35 ml (39.4 g) of nitromethane were added (ratio Zr/nitro compound 1:12.3).

The mixture was stirred for 2 hours at room temperature and then left to stand for one day. A slow stream of HCl was then passed through the solution for 10 minutes. The solution turned yellow in color during that time. When the still undissolved constituents (small amount) had settled, the supernatant solution was used to initiate the polymerization.

Use of the initiator systems of Examples 17 to 20

Example 21

In a two-liter four-necked flask, 700 g (679.2 ml) of methyl chloride and 120 g (2.14 mol) of isobutene were condensed (concentration 15 wt. %) under an argon atmosphere at a temperature of −95° C. After addition of 4.98 g (0.07 mol, 7.3 ml) of isoprene (3.3 mol %), 25 ml of initiator solution according to Example 17 were metered in during the course of 30 minutes. A milky suspension with occasional flocks was obtained, fouling did not occur. The weak reaction was terminated after 30 minutes.

The polymer that formed was precipitated by addition of 2500 ml of acetone, pre-dried by pressing on a laboratory roll and then dried overnight in vacuo at 50° C.

The analytical results are shown in Table 11 below.

TABLE 11

| Yield | 7.5 g (6%) |
|---|---|
| Staudinger index | 1.334 dl/g |
| Gel content | 1.8% |
| Molecular weight Mv | 412.9 kg/mol |
| Mn | 279.3 kg/mol |
| Mw | 563.4 kg/mol |

Example 22

In a two-liter four-necked flask, 700 g (679.2 ml) of methyl chloride and 120 g (2.14 mol) of isobutene were condensed (concentration 15 wt. %) under an argon atmosphere at a temperature of −95° C. After addition of 4.98 g (0.07 mol, 7.3 ml) of isoprene (3.3 mol %), 15 ml of initiator solution according to Example 18 were metered in during the course of 20 minutes. A milky suspension with occasional flocks was obtained, fouling did not occur. The vigorous reaction was terminated immediately after the addition was complete.

The polymer that formed was precipitated by addition of 2500 ml of acetone, pre-dried by pressing on a laboratory roll and then dried overnight in vacuo at 50° C.

The analytical results are shown in Table 12 below.

TABLE 12

| Yield | 20.7 g (16.5%) |
|---|---|
| Staudinger index | 1.489 dl/g |
| Gel content | 0.5% |
| Molecular weight Mv | 607.7 kg/mol |
| Mn | 336.4 kg/mol |
| Mw | 685.1 kg/mol |

Example 23

In a two-liter four-necked flask, 700 g (679.2 ml) of methyl chloride and 120 g (2.14 mol) of isobutene were condensed (concentration 15 wt. %) under an argon atmosphere at a temperature of −95° C. After addition of 4.98 g (0.07 mol, 7.3 ml) of isoprene (3.3 mol %), 66 ml of initiator solution according to Example 19 were metered in during the course of 70 minutes. A milky suspension with occasional flocks was obtained, fouling did not occur. The vigorous reaction was terminated immediately after the addition was complete.

The polymer that formed was precipitated by addition of 2500 ml of acetone, pre-dried by pressing on a laboratory roll and then dried overnight in vacuo at 50° C.

The analytical results are shown in Table 13 below.

TABLE 13

| Yield | 49.1 g (39.3%) |
|---|---|
| Staudinger index | 1.46 dl/g |
| Gel content | 0.4% |
| Molecular weight Mv | 475.6 kg/mol |
| Mooney value | 76 |

Example 24

In a two-liter four-necked flask, 700 g (679.2 ml) of methyl chloride and 120 g (2.14 mol) of isobutene were condensed (concentration 15 wt. %) under an argon atmosphere at a temperature of −95° C. After addition of 4.98 g (0.07 mol, 7.3 ml) of isoprene (3.3 mol %), 6 ml of initiator solution according to Example 20 were metered in during the course of 5 minutes. A milky suspension with occasional flocks was obtained, fouling did not occur. The vigorous reaction was terminated immediately after the addition was complete.

The polymer that formed was precipitated by addition of 2500 ml of acetone, pre-dried by pressing on a laboratory roll and then dried overnight in vacuo at 50° C.

The analytical results are shown in Table 14 below.

TABLE 14

| Yield | 12.2 g (9.8%) |
|---|---|
| Staudinger index | 2.079 dl/g |
| Gel content | 0.2% |
| Molecular weight Mv | 826.9 kg/mol |

Example 25 Hafnium tetrachloride/nitromethane 17.9 g (55.9 mmol) of hafnium tetrachloride were placed in a two-necked round-bottomed flask under an argon atmosphere. 450 ml of methylene chloride and 32 ml (36.1 g) of nitromethane were added (ratio Hf/nitro compound 1:10.6).

The mixture was stirred for 2 hours at room temperature and then left to stand for one day. The still undissolved constituents (small amount) settled at the bottom of the flask during that time. The colorless supernatant solution was used to initiate the polymerization.

Example 26

In a two-liter four-necked flask, 700 g (679.2 ml) of methyl chloride and 120 g (2.14 mol) of isobutene were condensed (concentration 15 wt. %) under an argon atmosphere at a temperature of −95° C. After addition of 4.98 g (0.07 mol, 7.3 ml) of isoprene (3.3 mol %), 11 ml of initiator solution according to Example 25 were metered in during the course of 15 minutes. A milky suspension with occasional flocks was obtained, fouling did not occur. The vigorous reaction was terminated immediately after the addition was complete.

The polymer that formed was precipitated by addition of 2500 ml of acetone, pre-dried by pressing on a laboratory roll and then dried overnight in vacuo at 50° C.

The analytical results are shown in Table 15 below.

TABLE 15

| Yield | 21 g (16.8%) |
|---|---|
| Staudinger index | 2.427 dl/g |
| Gel content | 0.4% |
| Molecular weight Mv | 1053 kg/mol |

FIG. 1 shows the molecular weight distribution of Example 2.

FIG. 2 shows Mv as a function of temperature, the parameters of the curve are $y=2E-05x^{14.133}$ $R^2=0.9559$.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A mixture comprising zirconium halides or hafnium halides or mixtures thereof and an organic nitro compound of the general formula (I)

$$R-NO_2 \qquad (I)$$

wherein R is selected from the group $C_1$–$C_{18}$-alkyl, $C_3$–$C_{18}$-cycloalkyl or $C_6$–$C_{24}$-cycloaryl.

2. A catalyst comprising a mixture of zirconium halides or hafnium halides or mixtures thereof and an organic nitro compound of the general formula (I)

$$R-NO_2 \qquad (I)$$

wherein R is selected from the group $C_1$–$C_{18}$-alkyl, $C_3$–$C_{18}$-cycloalkyl or $C_6$–$C_{24}$-cycloaryl.

3. A polymer produced by a process comprising the steps of preparing isoolefin copolymers in the presence of zirconium halides or hafnium halides or mixtures thereof and carrying out the polymerization in the presence of organic nitro compounds.

4. A polymer according to claim 3, wherein said mixture comprises up to 30 mol % isoprene.

5. A molded body comprising a polymer produced by a process comprising the steps of preparing isoolefin copolymers in the presence of zirconium halides or hafnium halides or mixtures thereof and carrying out the polymerization in the presence of organic nitro compounds.

* * * * *